(12) United States Patent
Susko et al.

(10) Patent No.: US 11,415,453 B1
(45) Date of Patent: Aug. 16, 2022

(54) WATER LEAK/WATER FLOW DETECTION SYSTEM

(71) Applicant: Susko Engineering, LLC, Goleta, CA (US)

(72) Inventors: Tyler Susko, Goleta, CA (US); Norman Arthur Hannotte, Santa Barbara, CA (US)

(73) Assignee: SUSKO ENGINEERING, LLC, Goleta, CA (US)

( * ) Notice: Subject to any disclaimer, the term of this patent is extended or adjusted under 35 U.S.C. 154(b) by 0 days.

(21) Appl. No.: 17/561,384

(22) Filed: Dec. 23, 2021

Related U.S. Application Data (60) Provisional application No. 63/153,709, filed on Feb. 25, 2021.

(51) Int. Cl.
*G01F 23/74* (2006.01)
*G01M 3/26* (2006.01)
*G01F 23/00* (2022.01)
*G01F 23/80* (2022.01)

(52) U.S. Cl.
CPC .......... *G01F 23/74* (2013.01); *G01F 23/0007* (2013.01); *G01F 23/808* (2022.01); *G01M 3/26* (2013.01)

(58) Field of Classification Search
CPC ..................................................... G01F 15/14
USPC ..................................................... 73/40–49.8
See application file for complete search history.

(56) References Cited

U.S. PATENT DOCUMENTS

| | | | | |
|---|---|---|---|---|
| 1,454,301 A * | 5/1923 | Hise Van | ............... | G01F 1/22 73/114.52 |
| 2,439,614 A * | 4/1948 | Schramm | ............... | G01F 1/22 73/196 |
| 2,778,223 A * | 1/1957 | Kimbrell | ............... | G01F 1/22 137/557 |
| 3,181,358 A * | 5/1965 | Busillo | ............... | G01F 1/22 73/861.55 |
| 3,522,731 A * | 8/1970 | Wilson | ............... | G01F 1/24 73/861.56 |
| 3,803,914 A * | 4/1974 | Noiles | ............... | A61M 5/16886 604/246 |

(Continued)

FOREIGN PATENT DOCUMENTS

| | | | | |
|---|---|---|---|---|
| BE | 1010408 A5 * | 7/1998 | .......... | G01M 3/2807 |
| CN | 208121907 U * | 11/2018 | ............. | E03B 7/071 |

(Continued)

OTHER PUBLICATIONS

ESPACENET Machine Translation of KR 1020050006016 A Which Originally Published On Jan. 15, 2005. (Year: 2005).*

Primary Examiner — David A. Rogers
(74) Attorney, Agent, or Firm — Billion & Armitage (57) ABSTRACT

A water monitoring device includes a housing, a graduated tube, a magnet, and a flow sensor. The graduated tube is positioned inside the housing and has a longitudinal axis and an inlet diameter less than an outlet diameter. The magnet is positioned within the graduated tube and configured to translate along the longitudinal axis of the graduated tube. The flow sensor is mounted within the housing and outside the graduated tube. The flow sensor is configured to detect the magnet and the position of the magnet along the longitudinal axis of the graduated tube correlates to a flow level through the water monitoring device.

6 Claims, 5 Drawing Sheets

(56) References Cited

U.S. PATENT DOCUMENTS

| | | | | |
|---|---|---|---|---|
| 4,173,890 A * | 11/1979 | Gilmont | G01F 1/22 | 73/202 |
| 4,457,171 A * | 7/1984 | Gebauer | G01F 23/72 | 73/DIG. 5 |
| 4,458,523 A * | 7/1984 | Moyer | G01M 3/26 | 73/49.7 |
| 4,507,976 A * | 4/1985 | Banko | G01F 1/24 | 73/DIG. 3 |
| 4,523,480 A * | 6/1985 | Inoue | G01F 1/24 | 73/861.56 |
| 5,099,698 A * | 3/1992 | Kath | G01F 1/22 | 73/861.56 |
| 5,186,058 A * | 2/1993 | Lew | G01F 1/24 | 73/861.56 |
| 5,187,988 A * | 2/1993 | Dettmer | G01F 15/06 | 73/861.56 |
| 5,193,400 A * | 3/1993 | Lew | G01F 1/86 | 73/440 |
| 5,373,746 A * | 12/1994 | Bloss | G01F 15/006 | 248/222.12 |
| 5,433,118 A * | 7/1995 | Castillo | G01F 1/115 | 73/861.77 |
| 5,544,533 A * | 8/1996 | Sugi | G01F 1/24 | 73/861.58 |
| 5,708,195 A * | 1/1998 | Kurisu | G01M 3/2815 | 73/40 |
| 5,744,701 A * | 4/1998 | Peterson | G01M 3/3245 | 73/40 |
| 5,911,219 A * | 6/1999 | Aylsworth | A61M 16/20 | 73/861.56 |
| 6,067,855 A * | 5/2000 | Brown | G01F 23/74 | 73/308 |
| 6,212,957 B1 * | 4/2001 | McCombs | G01F 1/22 | 73/861.55 |
| 6,563,306 B2 * | 5/2003 | Sato | G01F 1/24 | 324/207.2 |
| 6,935,190 B1 * | 8/2005 | Height | G01F 1/22 | 73/861.57 |
| 7,140,262 B1 * | 11/2006 | Vaughn | G01F 1/22 | 73/861.57 |
| 7,360,413 B2 * | 4/2008 | Jeffries | G01M 3/2807 | 73/239 |
| 7,549,348 B2 * | 6/2009 | Brown | G01F 1/28 | 73/861.58 |
| 7,782,461 B1 * | 8/2010 | Massey | G01P 13/0086 | 356/28 |
| 8,132,470 B2 * | 3/2012 | Koike | G01P 13/0013 | 604/246 |
| 8,174,398 B2 * | 5/2012 | Wien | G01M 3/2815 | 73/40.5 R |
| 8,256,304 B2 * | 9/2012 | Therrian | G01F 1/24 | 73/861.57 |
| 8,665,101 B2 * | 3/2014 | Solomon | G01M 3/243 | 73/152.58 |
| 8,833,390 B2 * | 9/2014 | Ball | G05D 7/0629 | 73/198 |
| 8,893,559 B2 * | 11/2014 | Drachmann | G01F 15/14 | 73/861.18 |
| 9,285,254 B2 * | 3/2016 | Lauber | G01F 15/14 | |
| 10,209,114 B2 * | 2/2019 | Oh | G01M 3/243 | |
| 10,422,670 B2 * | 9/2019 | Mohr | G01F 1/115 | |
| 10,690,527 B2 * | 6/2020 | Dennison | G01F 15/14 | |
| 10,782,163 B2 * | 9/2020 | Vromans | G01F 25/10 | |
| 10,857,557 B2 * | 12/2020 | Grimm | A01C 23/024 | |
| 10,870,970 B2 * | 12/2020 | Hammond | G08B 5/222 | |
| 10,948,379 B2 | 3/2021 | Knauss et al. | | |
| 11,047,115 B2 * | 6/2021 | Brotherton | E03B 7/071 | |
| 11,156,494 B2 * | 10/2021 | Serebryanov | G01F 23/74 | |
| 2005/0109105 A1 * | 5/2005 | Kowalski | G01F 23/74 | 340/623 |
| 2005/0242943 A1 * | 11/2005 | Matsumoto | H04Q 9/00 | 702/33 |
| 2008/0243657 A1 | 10/2008 | Voysey | | |
| 2010/0313675 A1 * | 12/2010 | Goegge | G01F 1/588 | 73/861.12 |
| 2013/0049743 A1 * | 2/2013 | Sawano | G01F 1/24 | 324/207.24 |
| 2013/0085688 A1 | 4/2013 | Miller et al. | | |
| 2014/0150554 A1 * | 6/2014 | Rada | G01F 1/66 | 73/602 |
| 2014/0279712 A1 | 9/2014 | Ortner | | |
| 2014/0337107 A1 | 11/2014 | Foster | | |
| 2016/0350880 A1 | 12/2016 | Tyner et al. | | |
| 2021/0381207 A1 * | 12/2021 | Brotherton | E03B 7/071 | |

FOREIGN PATENT DOCUMENTS

| | | | | |
|---|---|---|---|---|
| CN | 210833700 U | * | 6/2020 | |
| EP | 3330679 A1 | * | 6/2018 | G01F 1/588 |
| KR | 20050006016 A | * | 1/2005 | |
| WO | WO-2010039045 A1 | * | 4/2010 | E03B 7/071 |

\* cited by examiner

WATER LEAK/WATER FLOW DETECTION SYSTEM

TECHNICAL FIELD

This present disclosure relates to water monitoring equipment.

BACKGROUND

Water fixtures exist in residential and commercial spaces. Water fixtures are devices that use water such as toilets, showers, clothes washers, dishwashers, sinks, patio hoses, ice makers, soda machines, and ground irrigation equipment. Of particular importance for monitoring are toilets. Toilets are fixed receptacles, typically consisting of a large bowl connected to a system for flushing away waste into a sewer or septic tank. Multiunit dwellings are living and work areas in which multiple families or businesses may arise. In multiunit dwellings, there can be between tens, hundreds, or thousands of toilets. Toilets can leak, due to normal wear and tear over time or from other causes associated with the manufacturing or installation of systems within the toilet, and leaky toilets are the most significant cause of indoor water loss in multiunit dwellings. In some cases, a single leaking toilet may waste up to 5,000 gallons of water per day, costing nearly $3,000 per month due to the increases in water cost at higher usage. In other cases, leaks can be harder to detect, with smaller flows, wasting 100 gallons per day, costing $60 per month per toilet. Finding the particular leaky toilet in a multiunit dwelling can be very difficult, time-consuming, and costly if the units are not individually monitored.

SUMMARY

In one aspect, a water monitoring device includes a housing, a graduated tube, a magnet, and a flow sensor. The graduated tube is positioned inside the housing and has a longitudinal axis and an inlet diameter less than an outlet diameter. The magnet is positioned within the graduated tube and configured to translate along the longitudinal axis of the graduated tube. The flow sensor is mounted within the housing and outside the graduated tube. The flow sensor is configured to detect the position of the magnet along the longitudinal axis of the graduated tube, which correlates to a flow level through the water monitoring device.

In another aspect, a method of determining a flow level through a water monitoring device includes attaching the device to a source of water and determining the flow level. The water monitoring device includes a graduated tube positioned inside a housing, the graduated tube having a longitudinal axis and an inlet diameter less than an outlet diameter; a magnet positioned within the graduated tube and configured to translate along the longitudinal axis of the graduated tube, wherein translation of the magnet correlates to the flow level; and a flow sensor is mounted within the housing and outside the graduated tube, and configured to turn ON when the magnet is detected. The flow level is determined by detecting if the flow sensor is ON or OFF.

In a further aspect, a method of determining a water leak includes attaching a water monitoring device to a source of water and a water fixture having a predetermined flow duration, analyzing a transmitted data packet, wherein analyzing includes determining a time duration between the first and second flow sensor time signatures, comparing the time duration to a predetermined time, and transmitting a malfunction signal indicating a water leak if the time duration exceeds the predetermined time. The monitoring device includes a graduated tube positioned inside a housing, the graduated tube having a longitudinal axis and an inlet diameter less than an outlet diameter; a magnet positioned within the graduated tube and configured to translate along the longitudinal axis of the graduated tube, wherein translation of the magnet correlates to the flow level; and a flow sensor is mounted to a circuit board positioned within the water monitoring housing and outside the graduated tube, the flow sensor configured to turn ON when the magnet is detected, the flow sensor having a device ID. The circuit board is configured to: generate a first flow sensor time signature for the flow sensor when the flow sensor turns ON, generate a second flow sensor time signature for the flow sensor when the flow sensor turns OFF, and transmit a data packet that includes the first and second flow sensor time signatures and the device ID.

DETAILED DESCRIPTION

Described herein are devices 100 that may be used to monitor a flow level of liquid traveling through the device, detect a leak, and/or detect a malfunctioning water fixture. In some embodiments, device 100 is configured to be mounted to toilets or any other water fixture and to detect water flow and/or leaks. Additionally, although the discussed use of device 100 is to monitor water, the device may be configured to monitor any liquid. The device may be referred to as a monitoring device or a leak detection device. Hereinafter, the device will be referred to as a leak detection device and its use with a water fixture will be described.

Figure 1:
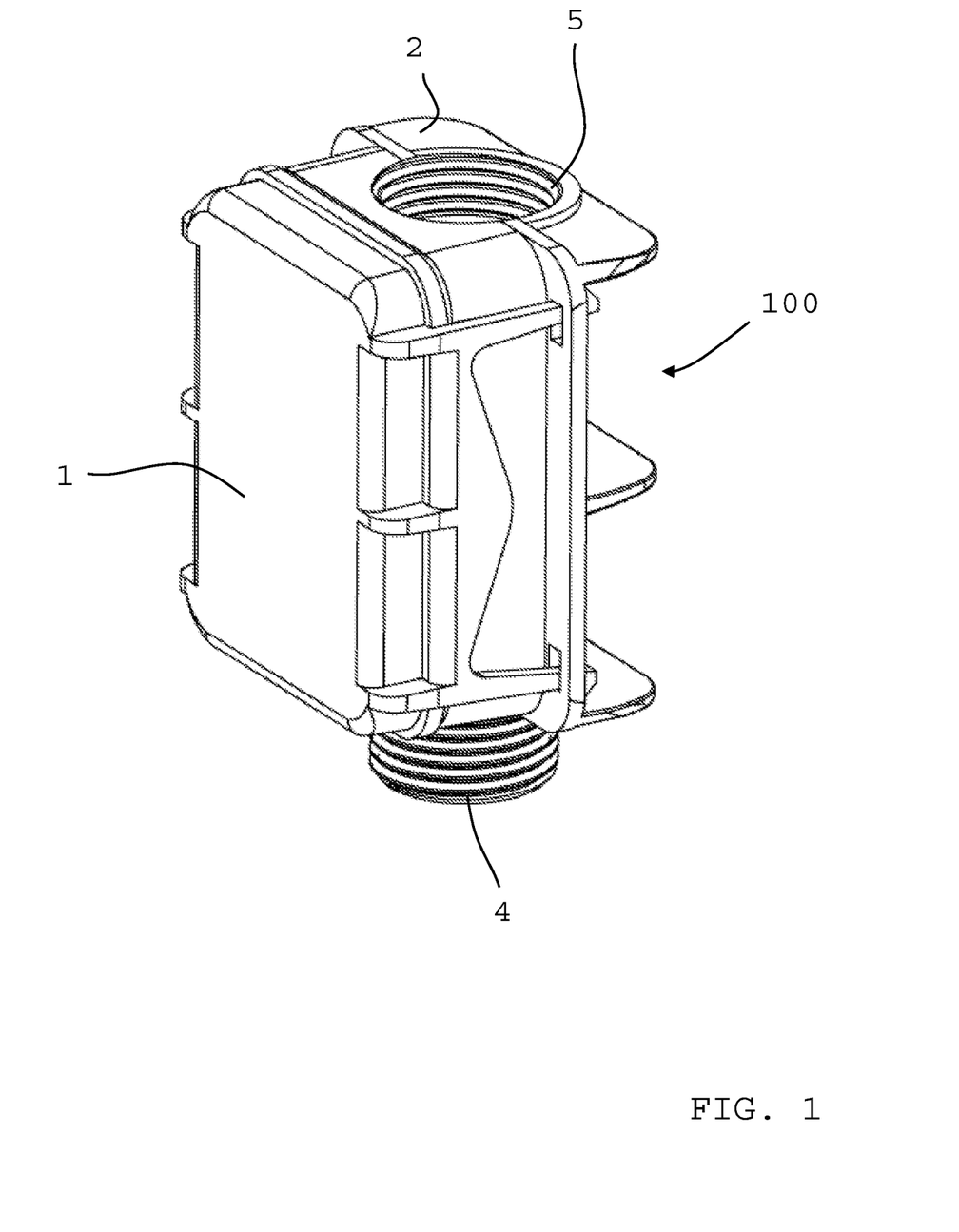
FIG. 1 is an isometric view of an exemplary water monitoring/leak detection device.
Figure 2:
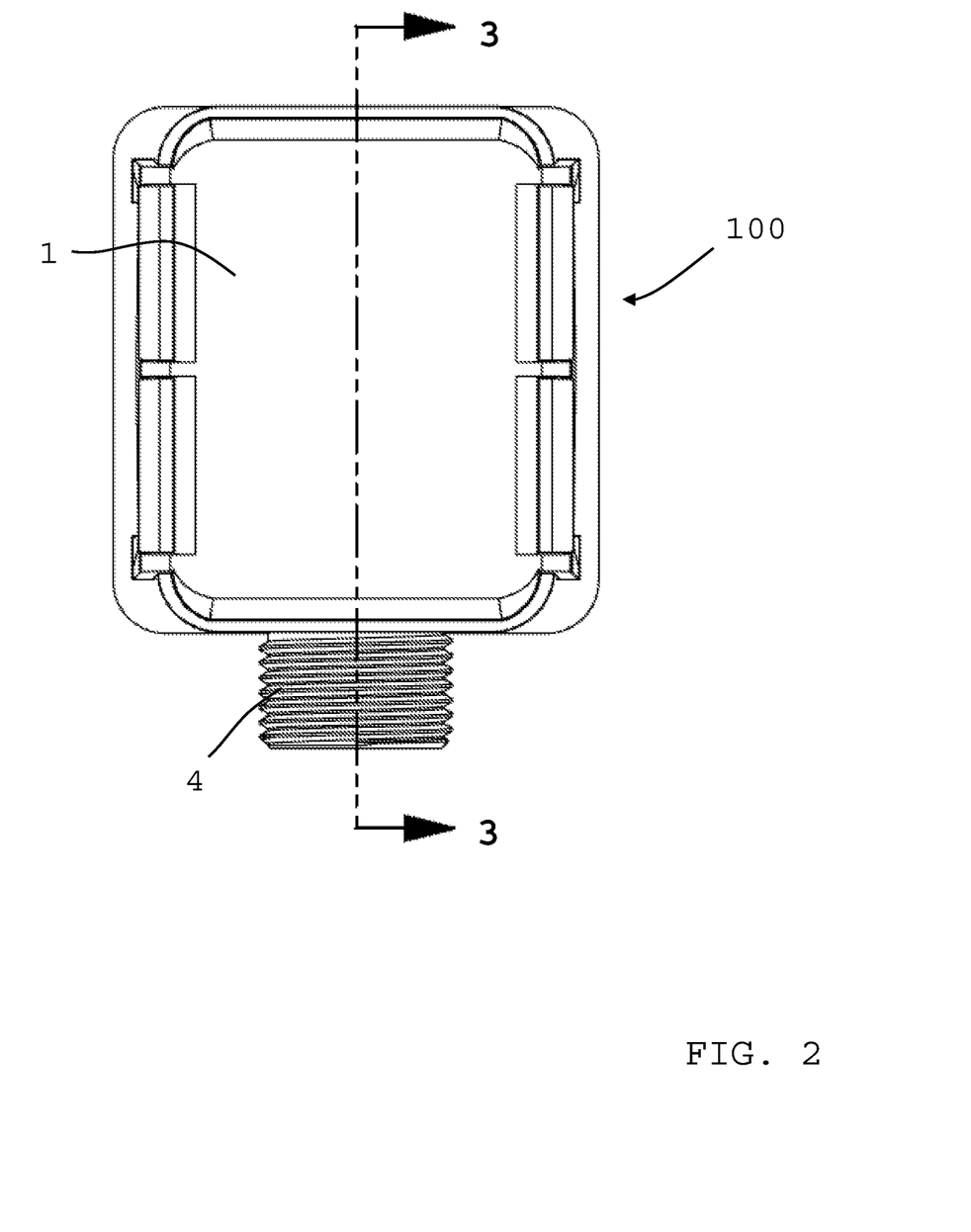
FIG. 2 is a front view of an exemplary water monitoring/leak detection device.

FIGS. 1 and 2 show an isometric view and a front view respectively, of an exemplary leak detection device 100. The leak detection device 100 includes a housing with a lid 1, a main body 2, a water supply fitting 4, and a water fixture fitting 5. The water supply fitting 4 is positioned at the inlet side of the leak detection device 100 and is adapted to receive/connect to a water supply line. The water fixture fitting 5 may be configured to attach to any water fixture, indoors or outdoors. The water fixture fitting 5 is positioned at the outlet side of the leak detection device 100 and is adapted to connect to the desired water fixture, such as a toilet. As used in this application, the terms "outlet" and "inlet", indicating the flow of water, are used to identify ends of the leak detection device 100 and/or components thereof. In some embodiments, the leak detection device 100 is positioned vertically with the water supply fitting 4 at the bottom and the water fixture fitting 5 located at the top.

Figure 3:
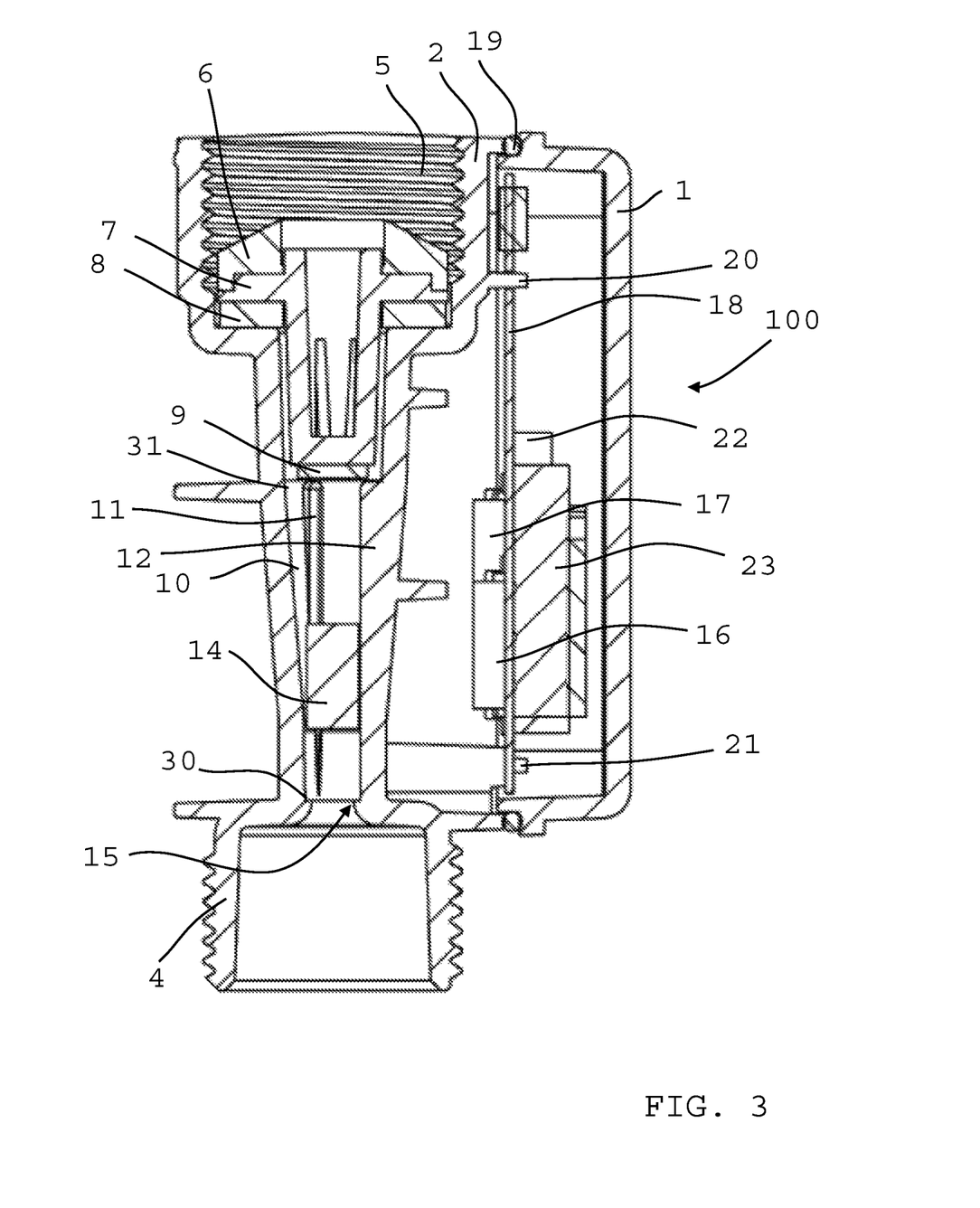
FIG. 3 a side section view taken along line 3-3 of FIG. 2.

FIG. 3 is a section view of FIG. 2 taken along line 3-3. In some embodiments, the leak detection device 100 further includes a compression gasket 6, a magnet stopper 7, a stopper seal 8, a graduated tube 10, guide rails 11, 12, 13, a magnet 14, a lip 15, a bottom pin 21, an upper pin 20, a seal 19, a circuit board 18, a low flow sensor 16, and a high flow sensor 17.

In some embodiments, seal 19 is positioned between lid 1 and main body 2 to form a sealed compartment. In this example, the sealed compartment houses a circuit board 18. In some embodiments, circuit board 18 is connected to the main body 2. In this example, the circuit board 18 is connected to the main body 2 via a top locating pin 20 and a bottom locating pin 21. Circuit board 18 lies on a plane parallel to the longitudinal axis of the main body 2. The sealed compartment protects the circuit board 18 and electronics connected thereto from water. In at least one embodiment, the circuit board 18 has at least one flow sensor 16, 17 connected thereto.

In this exemplary configuration, low flow sensor 16 and high flow sensor 17 are connected to circuit board 18. Additional flow sensors and/or other types of detection devices may be connected to the circuit board 18. In some embodiments, each sensor is configured to communicate wirelessly. In other embodiments, the circuit board 18 includes a microcontroller, an antenna, and internet of things (IOT) hardware to process, transmit and receive signals to communicate with a system of sensors and/or leak detection devices.

In at least one embodiment, a power source is in electrical communication with the circuit board 18 and/or component (s) connected to the circuit board 18, such as the flow sensor 16, 17. In this exemplary embodiment, a battery 22 is attached to a circuit board 18 via a battery holder 23.

The compression gasket 6, magnet stopper 7, graduated tube 10, guide rails 11, 12, 13, and magnet 14 are positioned inside the main body 2. As shown in FIG. 3, an exterior surface at the other end of the main body 2 is threaded to serve as the water supply fitting 4. Lip 15 of the main body 2 is located at the outlet of the water supply fitting 4.

The graduated tube 10 extends from lip 15. The graduated tube 10 has an inlet adjacent to lip 15 and an outlet adjacent to the inlet of the magnet stopper 7. The inlet of the graduated tube 10 has a first diameter 30 and the outlet has a second, larger, diameter 31. In some embodiments, the internal diameter of the graduated tube 10 gradually increases from the first diameter 30 to the second diameter 31. The graduated tube 10 may be a section of the main body 2 or a separate tube positioned inside the main body 2. In some embodiments, the graduated tube 10 is adapted to be mounted in an upright position, with the smaller inlet end positioned closer to the floor/ground than the larger outlet end, and sized such that the weight of the magnet 14 is offset by the fluidic drag associated with the magnet 14 translating within the graduated tube 10.

Magnet 14 has a predetermined volume and is positioned within the graduated tube 10. In some embodiments, when there is no water flowing through the graduate tube 10, magnet 14 rests on lip 15. When water is flowing through the graduated tube 10, magnet 14 is configured to translate/move away from lip 15 along guide rails 11, 12, 13. In some embodiments, the guide rails 11, 12, 13 extend from the inlet of the graduated tube 10 to the outlet of the graduated tube 10. In at least one embodiment, the guide rails 11, 12, 13 are arranged parallel to the longitudinal axis of the graduated tube 10.

In at least one embodiment, the guide rails 11, 12, 13 are connected to the structure forming the graduated tube 10, e.g., the main body 2 or the separate tube. In some of the embodiments where the graduated tube 10 is a section of the main body 2, the guide rails 11, 12, 13 are integral with, and extend inward from, the main body 2.

The inlet of the magnet stopper 7 is located adjacent to the outlet of the graduated tube 10. In some embodiments, the inlet end of the magnet stopper 7 is positioned to stop magnet 14 at a position indicative of maximum high flow. The outlet of the magnet stopper 7 is positioned between the compression gasket 6 and the stopper seal 8. In some embodiments, the stopper seal 8 rests on a ledge formed by the water fixture fitting 5. The stopper seal 8 is configured to seal the interface between the magnet stopper 7 and the main body 2. The compression gasket 6 is configured to seal the connection between the main body 2 and a water fixture screwed into the water fixture fitting 5. In some embodiments, the compression gasket 6 is positioned on the magnet stopper 7. The compression gasket 6, stopper seal 8, and a portion of the magnet stopper 7 are positioned within the water fixture fitting 5. In this example, an interior surface at the one end of the main body 2 is threaded to serve as the water fixture fitting 5.

In some embodiments, the leak detection device 100 further includes a magnet bumper 9 in contact with the inlet end of the magnet stopper 7. The magnet bumper 9 includes at least one water flow channel. In this exemplary configuration, the magnet bumper 9 rests/abuts an outlet end of the guide rails 11, 12, 13 (see e.g., FIG. 3). In some embodiments, the inlet end of the magnet bumper 9 is positioned to stop magnet 14 at a position indicative of maximum high flow.

In at least one embodiment, magnet stopper 7 and/or magnet bumper 9 is made from a material with a Shore durometer of 75D. An advantage of using a material with a Shore durometer of 75D is that vibrational noise, generated by magnet 14 hitting the magnet stopper/bumper 7, 9, is reduced or eliminated.

Figure 4:
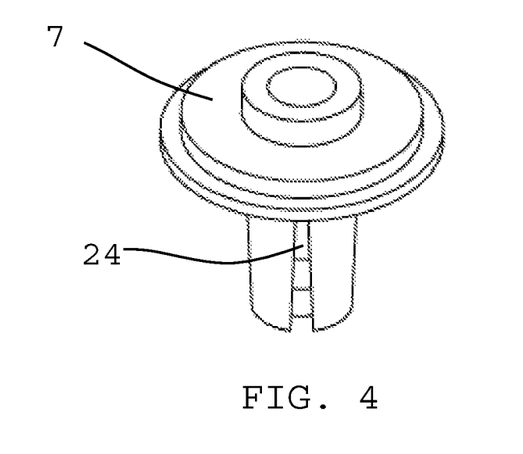
FIG. 4 is an isometric view of an exemplary magnet stopper.
Figure 5:
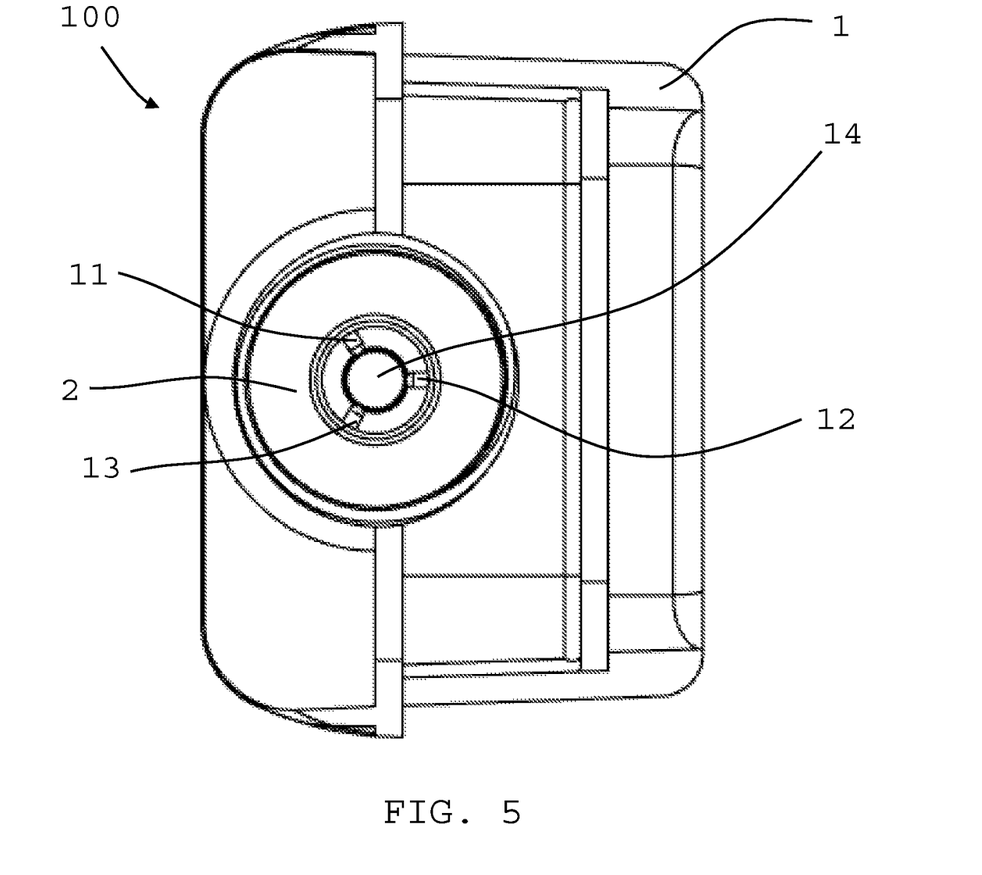
FIG. 5 is a top view of an exemplary water monitoring/leak detection device with the magnet stopper removed to illustrate the guide rails.

FIG. 4 is an isometric view of an exemplary magnet stopper 7. In this example, the magnet stopper 7 includes water flow channels 24. In some embodiments, water flow channels 24 are located between magnet 14, main body 2, and guide rails 11, 12, 13. In this exemplary configuration, the guide rails 11, 12, 13 extend along an exterior surface of magnet 14. In other embodiments, at least one guide rail 11, 12, 13 extends through a guide hole of the magnet 14 (not shown). In embodiments with a magnet bumper 9, the water flow channels 24 are in fluid communication with the water flow channel(s) of the magnet bumper (not shown).

In at least one embodiment, the leak detection device 100 has at least one light-emitting diode (LED) positioned on the exterior of the leak detection device (not shown). The LED is configured to emit at least one color of light.

In use, water enters the leak detection device 100 through the water supply fitting 4, travels through graduated tube 10 and water flow channels of the magnet stopper 7 and/or magnet bumper 9, exits the leak detection device 100 through the water fixture fitting 5, and continues to a water fixture (not shown).

Water flow through the graduated tube 10 pushes the magnet 14 along the graduated tube 10. In at least one embodiment, the guide rails 11, 12, 13 are arranged so magnet 14 translates along the longitudinal axis of the graduated tube 10. In some embodiments, the guide rails 11, 12, 13 align magnet 14 so that the magnet 14 does not tilt during translation in the graduated tube 10. This was experimentally found to give more reliable readings by the flow sensors 16, 17 because rotation of the magnet 14 alters the magnetic field sensed by the flow sensors 16, 17.

The water flow rate may be described as low flow, intermediate flow, and high flow. The position of magnet 14 in the graduated tube 10 depends on the water flow. In some embodiments, as the flow rate increases the position of magnet 14 changes. Magnet 14 has an equilibrium position between the lip 15 and the magnet stopper 7 and/or magnet bumper 9. Magnet 14 will reach an equilibrium position when the force due to fluidic drag equals the weight of the magnet 14. The drag force is a function of volumetric flow rate and the gap between the magnet 14 and the wall of the graduated tube 10. As the magnet 14 travels higher/further along in the graduated tube 10, the fluidic drag is reduced for the same flow rate. At any level of intermediate flow, magnet 14 will rest at its equilibrium position when the weight of the magnet 14 equals the fluidic drag force of the moving water experienced by magnet 14. At high flow, magnet 14 rests against either the magnet stopper 7 or the magnet bumper 9.

In at least one embodiment, the flow sensor 16, 17 is configured to determine/detect the position of the magnet 14 within the graduated tube 10 and/or determine the duration of flow through the leak detection device 100. In some embodiments, the flow sensor 16, 17 is a magnetic sensor. Examples of sensors that may be used for the flow sensor 16, 17 include reed switches and hall effect sensors In some embodiments, the position of the magnet 14 within the graduated tube 10 can be correlated to a flow level/rate. In additional embodiments, the duration of flow can be compared to a predetermined duration and, if the measured flow duration exceeds the predetermined duration, a leak has been identified. In a further embodiment, the duration of flow at a predetermined level, e.g., high flow, is measured. In one example, if the sensed duration of water flow is greater than expected, e.g. for one flush of the toilet, a leak has been detected. In some embodiments, a malfunction signal is transmitted and/or displayed when a leak is identified. The malfunction signal may be a text or email message/alert sent to a user or a visual signal such as the LED light on the leak detection device 100.

In some embodiments, the activation zone of flow sensors 16, 17 (or the zone at which a flow sensor reads the magnetic field of the magnet 14) overlap to create unique discrete levels of flow, from no flow to high flow. For two flow sensors with overlapping activation zones, there will be 4 states: Off-Off (no flow), On-Off (low flow), On-On (intermediate flow), and Off-On (high flow). The positions of the flow sensors 16, 17 can be tuned such that both flow sensors 16, 17 sense no magnetic field when water is not flowing, low flow when only the low flow sensor 16 senses the magnet 14, medium flow when both flow sensors 16, 17 sense the magnet 14, and high flow when only the high flow sensor 17 senses the magnet 14. In some embodiments, additional flow sensors are placed along the axial path of the magnetic flow to detect additional discrete levels of flow.

The ability to measure discrete values of flow offers several advantages. The combined state of all flow sensors can be assembled to output meaningful data to a user, which can be displayed in a meaningful way. Alternatively, the flow sensors 16, 17 can be used independently such that the number of discrete flow levels equals the number of flow sensors.

In some embodiments, data can be displayed directly to a user with the use of LED lights indicating the state of each sensor 16, 17. In one example, a LED associated with each of the flow sensors 16, 17 turns ON (is illuminated), when the respective flow sensor detects the magnet 14. In another exemplary configuration, the flow sensor states can be combined by a device capable of basic computing power to detect the flow rate at the threshold values associated with the state changes of the device. The color of light emitted by the LED may indicate the state of the corresponding sensor, the flow level, a leak, and/or malfunction of a water fixture.

In some embodiments, a leak detection device 100 as disclosed herein has fewer moving parts as compared to a paddlewheel design. Additionally, embodiments of the leak detection device 100 using reed switches for the flow sensors may be configured so that the signal of the reed switch is configured to power a LED that can signal a type of flow, e.g., high flow, or to send a single digital signal to a microcontroller. Furthermore, a leak detection device 100 as disclosed herein can send signals in real-time, in contrast to intermittent signals sent by a typical paddlewheel design.

In other embodiments, the flow sensor states can be combined/analyzed by a device configured to detect the flow rate at the threshold values associated with the state changes of the device.

In at least one embodiment, a network of at least one leak detection device 100 is configured to communicate data to a database and/or server. In one embodiment, each leak detection device 100 is configured to communicate with the mesh network, and messages sent over the network terminate at a gateway. The gateway is a device that will interface between the mesh and the internet. In some embodiments, the mesh network includes a device configured to detect flow rate thresholds and a radio for direct communication between leak detection devices 100 to form a mesh network of communication between all leak detection devices 100 in the network. In some embodiments, the internet is used to relay data to an end-user.

Figure 6:
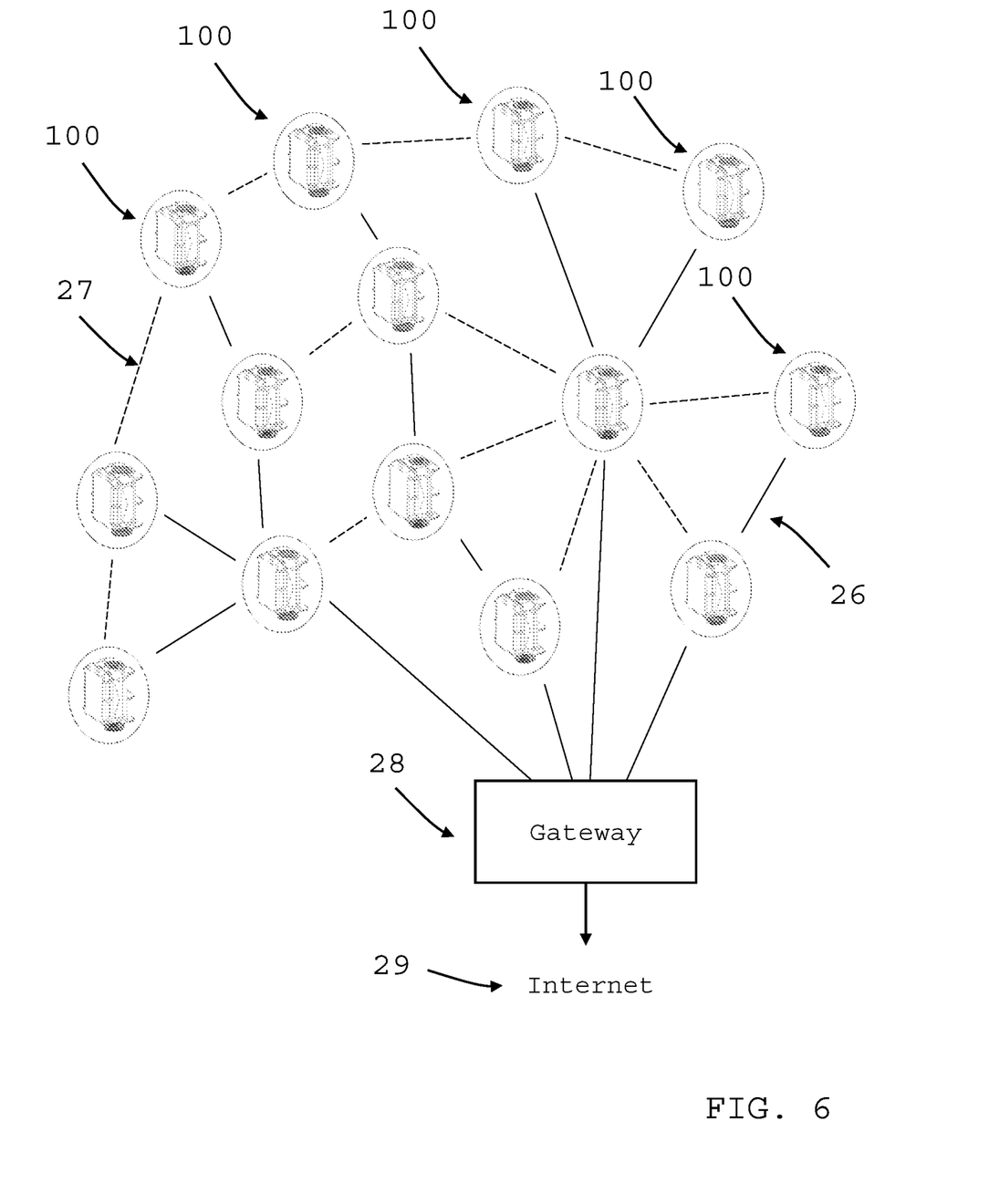
FIG. 6 is an exemplary self-healing mesh network of water monitoring/leak detection devices communicating with a gateway.

FIG. 6 shows an exemplary wireless mesh network with a plurality of water leak detection devices 100 forming the nodes of the mesh network. In some embodiments, the wireless mesh network comprises a collection of geographically proximate water leak detection devices 100 in a multi-unit building or complex.

In some embodiments, the wireless mesh network has at least one primary path 26 and at least one secondary path 27. Exemplary primary paths 26 are represented by solid lines and exemplary secondary paths are represented by a dotted line Secondary paths 27 may be used when a primary path 26 is blocked or a sensor of a leak detection device 100 becomes unresponsive. A mesh network with this configuration may be described as "self-healing" because it ensures each message is delivered to the internet. Gateway 28 is a hardware device configured to receive signals from the mesh network and to communicate those messages/signals to the internet 29 to be received by a database or server. The internet connection between the gateway and the internet may be wireless or wired.

An exemplary method of using the leak detection devices 100 in a mesh network includes using at least one component on the circuit board 18 to create a sensor time signature upon state change away from the no-flow state, creating at least one data packet, and transmitting the data packets through the mesh. In some embodiments, the data packet includes the flow sensor time signature, the flow state of the sensor, and an identity of the leak detection device 100. Transmitted data packets are collected at the central gateway 18. In some embodiments, the data packets are transmitted from gateway 18 to an internet-based database manager configured with software to analyze the data packets to determine if a leak is present or if a leak detection device 100 is malfunctioning. An advantage of sending raw data is that additional troubleshooting/analysis of the raw data can be done.

In other embodiments, processing the data for leak detection is conducted locally on each flow sensor and/or by a device positioned on the circuit board 18, and a data packet is sent only when the flow sensor has determined that a leak condition has been met. An advantage of onboard processing is that fewer data packets will be sent which increases the battery life of the leak detection devices 100.

In an alternative embodiment, the gateway is configured to process raw time signatures and identities, to send the raw data to the cloud and/or another computing device, or to perform an intermediate method of assembling data.

In some embodiments, the mesh network includes other detectors/devices in addition to the toilet leak detectors. Examples of additional devices that may be included as nodes of the mesh network include fire detectors, smoke detectors, carbon monoxide detectors, moisture sensors for indoor flooding events, door locks, thermostats, cameras, extenders, and/or security sensors attached to doors and windows.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

What is claimed is:

1. A method of determining a water leak comprising:
   attaching a water monitoring device to a source of water and to a water fixture having a predetermined flow duration, the water monitoring device comprising:
   a graduated tube positioned inside a housing, the graduated tube having a longitudinal axis and an inlet diameter less than an outlet diameter;
   a magnet positioned within the graduated tube and configured to translate along the longitudinal axis of the graduated tube, wherein translation of the magnet correlates to the flow level; and
   a flow sensor mounted to a circuit board positioned within the housing and outside the graduated tube, the flow sensor configured to turn ON when the magnet is detected, the flow sensor having a device ID;
   wherein the circuit board is configured to:
   generate a first flow sensor time signature for the flow sensor when the flow sensor turns ON;
   generate a second flow sensor time signature for the flow sensor when the flow sensor turns OFF; and
   transmit a data packet that includes the first and second flow sensor time signatures and the device ID;
   analyzing a transmitted data packet, wherein analyzing includes determining a time duration between the first and second flow sensor time signatures;
   comparing the time duration to a predetermined time; and
   transmitting a malfunction signal indicating a water leak if the time duration exceeds the predetermined time.

2. The method of claim 1, the housing comprising a main body, wherein the graduated tube is positioned inside the main body and the flow sensor is mounted on a circuit board, the circuit board mounted in a sealed compartment formed by a seal positioned between a lid and the main body.

3. The method of claim 2, the main body further comprising:
   an inlet fitting adapted to connect to a water supply line;
   an outlet fitting with a ledge and a compression gasket for connecting to a water fixture;
   a stopper seal positioned on the ledge of the outlet fitting; and
   a magnet stopper with an outlet end positioned within the outlet fitting between the compression gasket and the stopper seal, and an inlet end positioned adjacent to the outlet of the graduated tube.

4. A method of determining a water leak comprising:
   attaching a water monitoring device to a source of water and to a water fixture having a predetermined flow duration, the water monitoring device comprising:
   a graduated tube positioned inside a housing, the graduated tube having a longitudinal axis and an inlet diameter less than an outlet diameter;
   a magnet positioned within the graduated tube and configured to translate along the longitudinal axis of the graduated tube, wherein translation of the magnet correlates to the flow level; and
   a flow sensor mounted to a circuit board positioned within the housing and outside the graduated tube, the flow sensor configured to turn ON when the magnet is detected, the flow sensor having a device ID;
   wherein the circuit board is configured to:
   generate a first flow sensor time signature for the flow sensor when the flow sensor turns ON;
   generate a second flow sensor time signature for the flow sensor when the flow sensor turns OFF;
   analyze a time duration between the first and second flow sensor time signatures;
   compare the time duration to a predetermined time; and
   transmit a data packet that includes a malfunction signal indicating a water leak if the time duration exceeds the predetermined time.

5. The method of claim 4, the housing comprising a main body, wherein the graduated tube is positioned inside the main body and the flow sensor is mounted on a circuit board, the circuit board mounted in a sealed compartment formed by a seal positioned between a lid and the main body.

6. The method of claim 5, the main body further comprising:
   an inlet fitting adapted to connect to a water supply line;
   an outlet fitting with a ledge and a compression gasket for connecting to a water fixture;
   a stopper seal positioned on the ledge of the outlet fitting; and
   a magnet stopper with an outlet end positioned within the outlet fitting between the compression gasket and the stopper seal, and an inlet end positioned adjacent to the outlet of the graduated tube.

* * * * *